United States Patent
Labbee et al.

(10) Patent No.: US 10,610,056 B2
(45) Date of Patent: Apr. 7, 2020

(54) TONGS FOR FOOD PREPARATION AND A METHOD FOR PREPARING FOOD USING TONGS

(71) Applicants: Matthias Labbee, Quebec (CA); Jonathan Labbee, St-Lazare (CA); Nicolas Gosselin, Quebec (CA)

(72) Inventors: Matthias Labbee, Quebec (CA); Jonathan Labbee, St-Lazare (CA); Nicolas Gosselin, Quebec (CA)

( * ) Notice: Subject to any disclaimer, the term of this patent is extended or adjusted under 35 U.S.C. 154(b) by 83 days.

(21) Appl. No.: 15/663,091

(22) Filed: Jul. 28, 2017

(65) Prior Publication Data

US 2018/0028021 A1 Feb. 1, 2018

Related U.S. Application Data

(60) Provisional application No. 62/368,580, filed on Jul. 29, 2016.

(51) Int. Cl.
*A47J 43/28* (2006.01)
*A47G 21/10* (2006.01)

(52) U.S. Cl.
CPC .......... *A47J 43/283* (2013.01); *A47J 43/288* (2013.01); *A47G 21/10* (2013.01)

(58) Field of Classification Search
CPC ........ A47J 43/283; A47J 43/288; A47J 45/10; A47J 37/0786; F23J 1/04; F24B 1/199; F24B 15/10; B25F 1/003; A47G 21/10
USPC ............. 294/11, 5, 3, 218, 219, 99.2, 10, 93
See application file for complete search history.

(56) References Cited

U.S. PATENT DOCUMENTS

| | | | | |
|---|---|---|---|---|
| 398,129 | A * | 2/1889 | Cook | F24B 15/10 294/10 |
| 1,497,542 | A * | 6/1924 | Carlson | F24B 15/10 294/11 |
| 1,503,898 | A * | 8/1924 | Hott | F24B 15/10 244/103 R |
| 2,012,345 | A * | 8/1935 | Mecuda | F24B 15/10 294/11 |
| 2,307,884 | A * | 1/1943 | Greenwood | H01R 13/60 29/235 |
| 2,536,873 | A * | 1/1951 | Culp | A47L 17/10 15/229.13 |

(Continued)

FOREIGN PATENT DOCUMENTS

| | | | | |
|---|---|---|---|---|
| CH | | 176592 A * | 4/1935 | A47G 21/10 |
| CH | | 682125 A5 * | 7/1993 | A47G 21/10 |

(Continued)

*Primary Examiner* — Dean J Kramer
(74) *Attorney, Agent, or Firm* — BCF LLP

(57) ABSTRACT

Tongs for food preparation and a method for preparing food using tongs are presented. The tongs include a first and second arm connected to a connecting portion, the arms including each a head portion including a gripper portion for grabbing a food item when the first and second heads are brought toward each other, the gripper portion defining a portion of a cavity for holding the food item, and a spreader portion for inserting into and spreading portions of a receiving food item when the first and second heads are moved away from each other, the gripper portions of the first and second head portions being both disposed on a first side of a center plane, the spreader portions of the first and second head portions being both disposed on a second side of the center plane.

16 Claims, 18 Drawing Sheets

(56) References Cited

U.S. PATENT DOCUMENTS

| | | | | |
|---|---|---|---|---|
| 2,557,846 | A * | 6/1951 | Ste Marie | A47J 43/283 294/104 |
| 2,800,714 | A * | 7/1957 | Evans | A47G 21/045 294/3 |
| 2,929,166 | A * | 3/1960 | Sneide | A01K 97/00 119/6.7 |
| 3,138,211 | A * | 6/1964 | Blom | A01G 20/30 172/371 |
| 5,121,956 | A * | 6/1992 | Horkey | F24B 1/199 294/11 |
| D341,998 | S * | 12/1993 | Tanfoglio | D7/686 |
| D406,734 | S * | 3/1999 | Doherty | D7/686 |
| D439,810 | S * | 4/2001 | Lambrecht | D7/686 |
| D475,585 | S * | 6/2003 | Chen | D7/686 |
| D505,599 | S * | 5/2005 | Fiedeler | D7/686 |
| 7,458,622 | B2 * | 12/2008 | Tardif | A47J 43/283 294/16 |
| D606,815 | S * | 12/2009 | Gallop | D7/686 |
| 7,628,432 | B2 * | 12/2009 | Flather | A47G 21/10 294/3 |
| 8,348,316 | B2 * | 1/2013 | Hemmings | A47J 43/283 294/7 |
| D692,284 | S * | 10/2013 | Horito | D7/686 |
| D711,697 | S * | 8/2014 | Delgado Carmona | D7/686 |
| 2001/0033083 | A1 * | 10/2001 | Kaposi | A47G 21/10 294/99.2 |
| 2008/0224490 | A1 * | 9/2008 | Ina | A47G 21/10 294/99.2 |
| 2009/0284031 | A1 * | 11/2009 | Pavicsits | A47J 43/283 294/16 |
| 2016/0066723 | A1 * | 3/2016 | Prommel | A47J 43/281 30/124 |
| 2016/0278579 | A1 * | 9/2016 | Goddard | A47J 43/283 |
| 2017/0007072 | A1 * | 1/2017 | Stern | A47J 43/283 |
| 2018/0028006 | A1 * | 2/2018 | Littledeer | A47G 21/10 |

FOREIGN PATENT DOCUMENTS

| | | | | |
|---|---|---|---|---|
| DE | 822008 C | * | 11/1951 | A47G 21/10 |
| DE | 3632102 A1 | * | 4/1987 | A47G 21/10 |
| GB | 1542762 A | * | 3/1979 | A47G 21/10 |
| WO | WO-2017052513 A1 | * | 3/2017 | A47G 21/10 |

* cited by examiner

TONGS FOR FOOD PREPARATION AND A METHOD FOR PREPARING FOOD USING TONGS

CROSS-REFERENCE

The present application claims priority to U.S. Provisional Patent Application 62/368,580, filed Jul. 29, 2016, entitled "Tongs For Food Preparation And A Method For Preparing Food Using Tongs", the entirety of which is incorporated by reference.

TECHNICAL FIELD

The present technology relates to tongs for food preparation, especially for preparing sausages, hot dogs, and other cylindrically shaped food items.

BACKGROUND

Kitchen or barbecue tongs are used in preparing food on grills or barbecues. Some foods, such as sausages and hot dogs, can be difficult to manipulate when rotating on and removing from the grill, due to their cylindrical shape. Further, while stabbing the sausages with a fork or sharp implement can overcome any slippage while manipulating, this can cause them to lose liquid, negatively affecting flavor and/or texture of the sausages.

Additionally, sausages and hot dogs are often served in buns or rolls, necessitating a user to hold open or spread portions of the buns while simultaneously manipulating the cooked and hot sausage. Further, the bun itself may be hot from toasting on the grill, so the user may need to use a second utensil to hold and/or open the bun in order to assemble the sausage and bun for dinner guests.

Therefore there is a desire for barbecue tongs capable of both manipulating sausages on a hot grill or pans or other cooking surfaces, generally without causing loss of liquids in the sausages, and for joining the sausage with its bun.

SUMMARY

It is an object of the present technology to ameliorate at least some of the inconveniences present in the prior art.

One broad aspect of the present technology provides tongs for food preparation comprising a connecting portion; a first arm connected to the connecting portion at a first end of the first arm, the first arm defining a first centerline extending through a center of the first arm; a second arm connected to the connecting portion at a first end of the second arm, the second arm defining a second centerline extending through a center of the second arm, the first and second arms being disposed on a same side of the connecting portion; a first head portion connected to the first arm at a second end of the first arm; and a second head portion connected to the second arm at a second end of the second arm, each of the first and second head portions including a gripper portion for grabbing a food item when the first and second heads are brought toward each other, the gripper portion defining a portion of a cavity for holding the food item, and a spreader portion for inserting into and spreading portions of a receiving food item when the first and second heads are moved away from each other, a majority of the gripper portion and a majority of the spreader portion of each of the first and second head portions being disposed on opposite sides of a center plane extending through the first and second centerlines, the gripper portions of the first and second head portions being both disposed on a first side of the center plane, the spreader portions of the first and second head portions being both disposed on a second side of the center plane.

In some implementations, the first and second head portions are mirror images of each other about a plane passing through a center of the connecting portion, the plane being generally perpendicular to the center plane.

In some implementations, the gripper portions of the first and second head portions each include a plurality of teeth, the plurality of teeth being disposed on a side of the gripper portions opposite the center plane.

In some implementations, the tongs further comprise a first handle portion connected to the first arm and a second handle portion connected to the second arm.

In some implementations, the connecting portion biases the first and second arms apart.

In some implementations, the first and second head portions each further include a central portion between the gripper portion and the spreader portion, the gripper and spreader portions connecting to their respective arms through the central portion.

In some implementations, the spreader portions of the first and second head portions each further include a blade portion, the blade portion being generally parallel to the central portion.

In some implementations, when the tongs are in a closed position, the blade portions of the first arm and second head portions touch each other while the gripper portions of the first and second head portions are spaced from each other.

In some implementations, for each of the first and second head portions, the spreader portion and the gripper portion are integral with the central portion.

In some implementations, for each of the first and second head portions, the central portion tapers as the central portion extends away from the connecting portion.

In some implementations, the tongs further comprise, for each of the first and second head portions, a transition region between the blade portion and the central portion, the transition region defining an other portion of the cavity, the transition region being generally curved out away from the cavity.

In some implementations, the tongs further comprise, for each of the first and second head portions, a transition region between the blade portion and the central portion, the transition region being disposed at an angle of about 45 degrees toward the cavity from a plane passing though the central portion.

In some implementations, the gripper portions of the first and second head portions are generally curved from the central portion toward an other one of the first and second head portions, the cavity defined at least in part by the gripper portions being configured for holding a cylindrical food item.

In some implementations, the gripper portions of the first and second head portions are each disposed at an angle of about 40 degrees toward the cavity from a plane passing though the central portion.

In some implementations, the cavity formed by the first and second head portions when in a closed position is configured to hold a cylindrical food item.

According to another broad aspect of the present technology, there is provided a method for preparing food using tongs, the method comprising grabbing a cylindrical food item with two gripper portions of the tongs; flipping the tongs such that the gripper portions are oriented upwards, the cylindrical food item aligning with two spreader portions opposite the gripper portions; inserting the two spreader portions into a receiving food item; and opening the tongs such the cylindrical food item drops into the receiving food item.

In some implementations, the method further comprises gripping the cylindrical food item with the two gripper portions for turning the cylindrical food item during cooking.

In some implementations, opening the tongs spreads apart portions of the receiving food item.

Additional and/or alternative objects, features, and advantages of the implementations of the present invention will become apparent from the following description, the accompanying drawings, and the appended claims.

BRIEF DESCRIPTION OF THE DRAWINGS

For a better understanding of the present invention as well as other objects and further features thereof, reference is made to the following description which is to be used in conjunction with the accompanying drawings, where.

DETAILED DESCRIPTION

Figure 1:
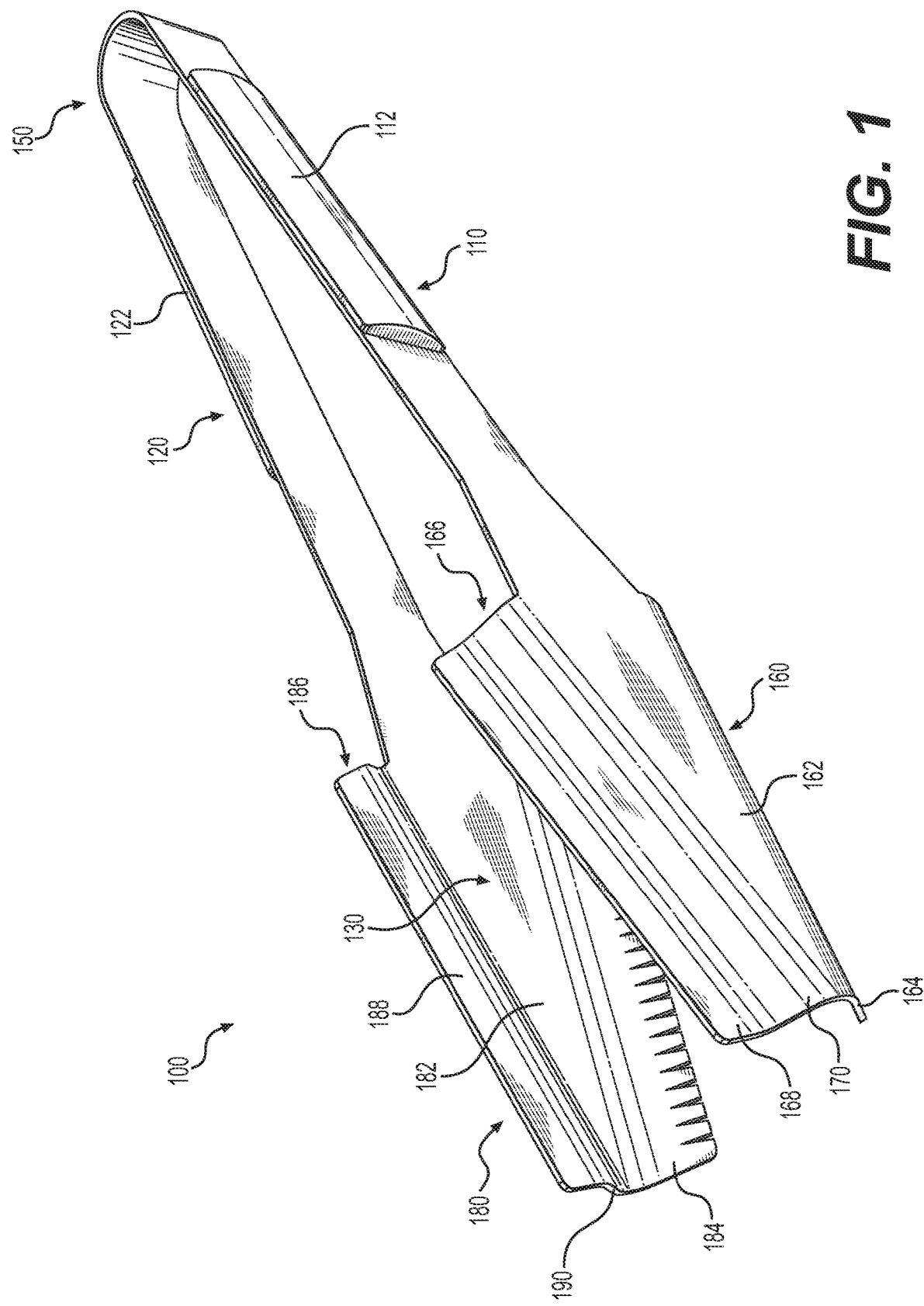
FIG. 1 is a top, front, and left side perspective view of one implementation of tongs according to the present technology.
Figure 2:
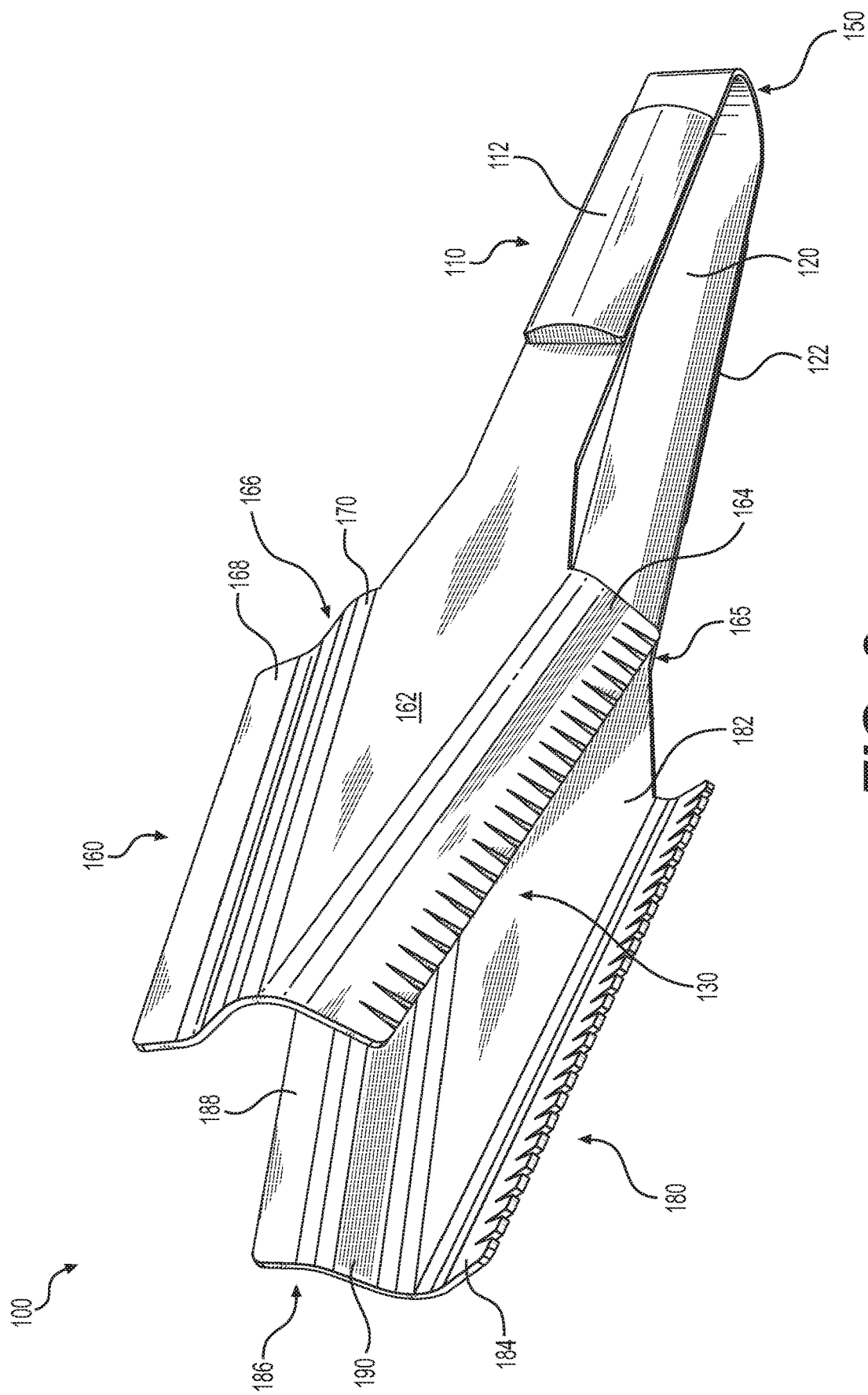
FIG. 2 is a bottom, front, and left side perspective view of the tongs of FIG. 1.
Figure 3:
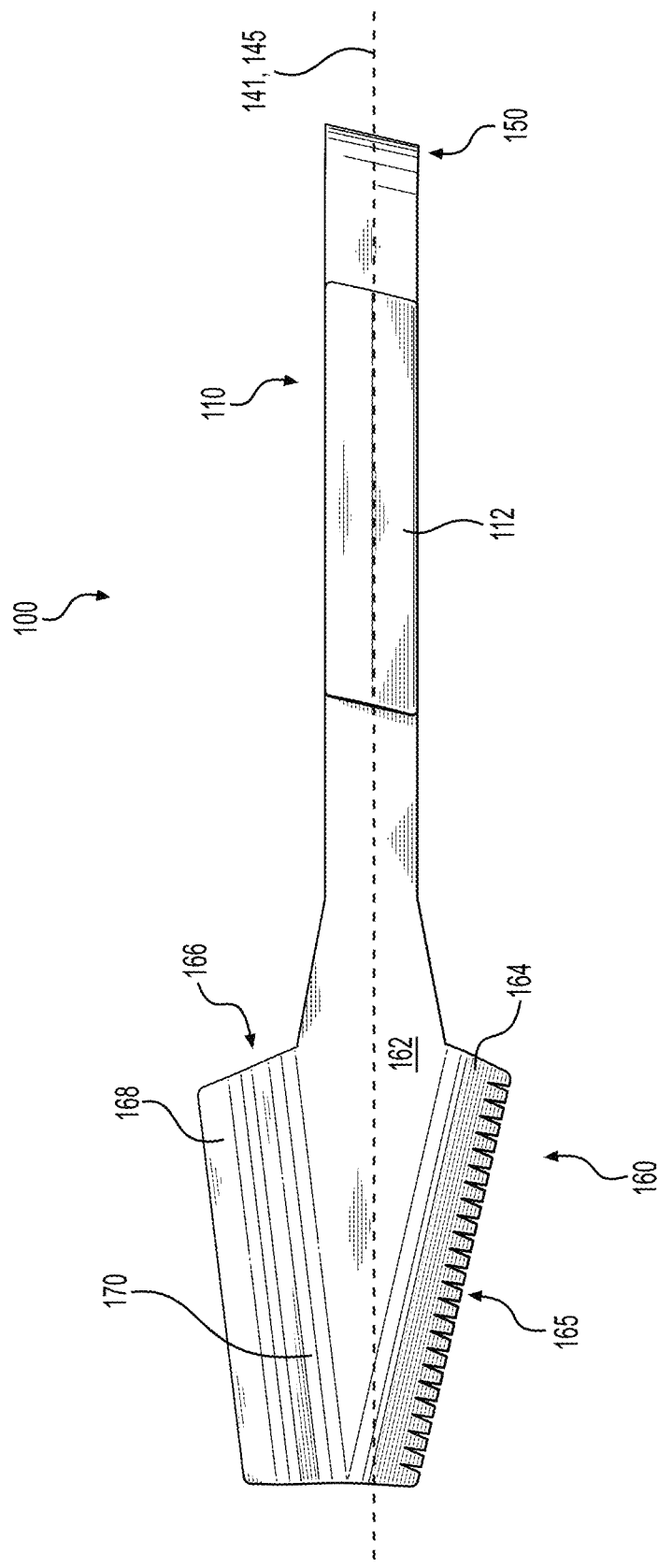
FIG. 3 is a left side elevation view of the tongs of FIG. 1.
Figure 4:
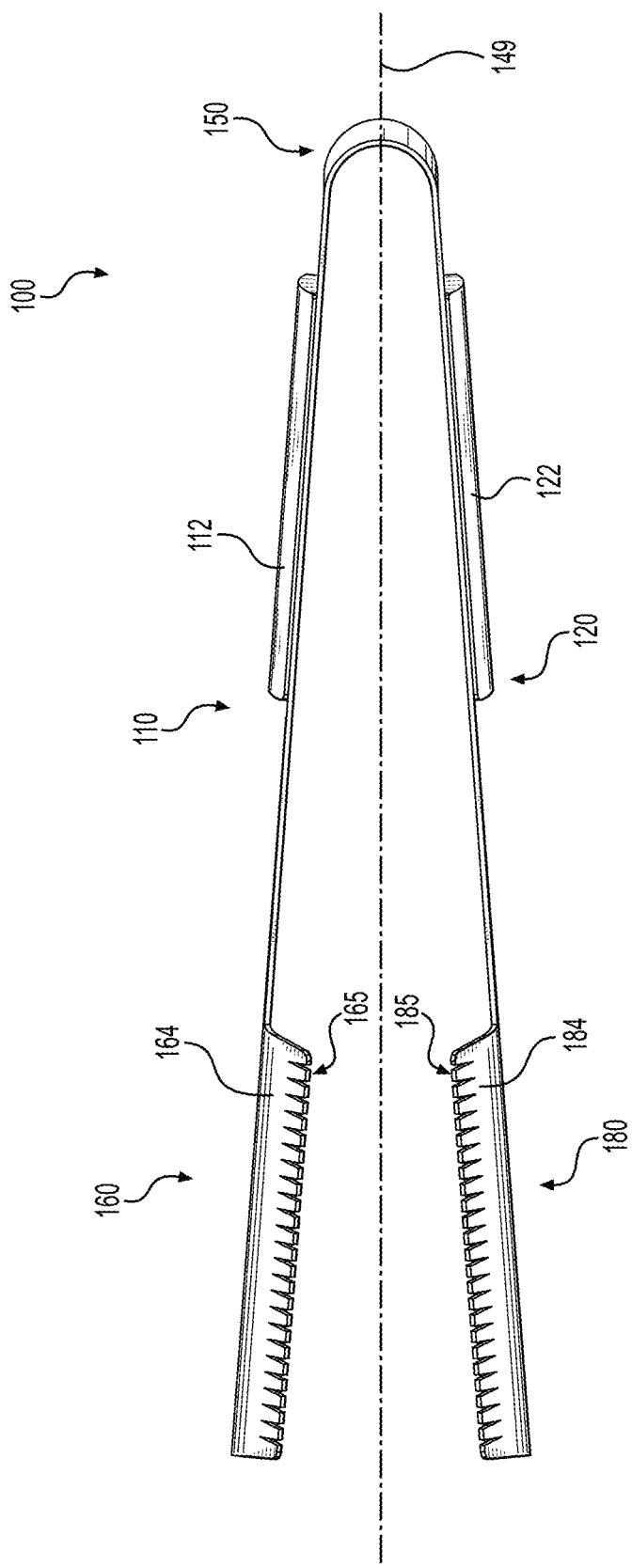
FIG. 4 is a bottom plan view of the tongs of FIG. 1.
Figure 5:
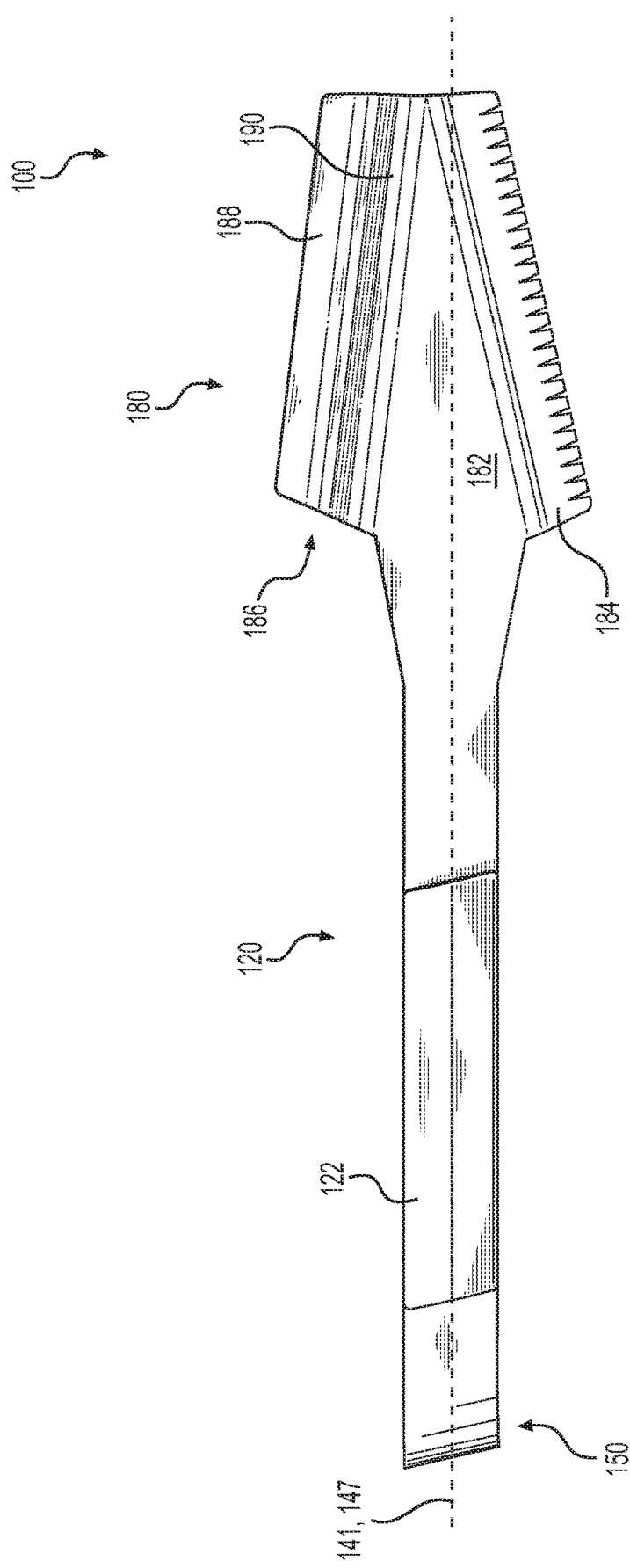
FIG. 5 is a right side elevation view of the tongs of FIG. 1.
Figure 6:
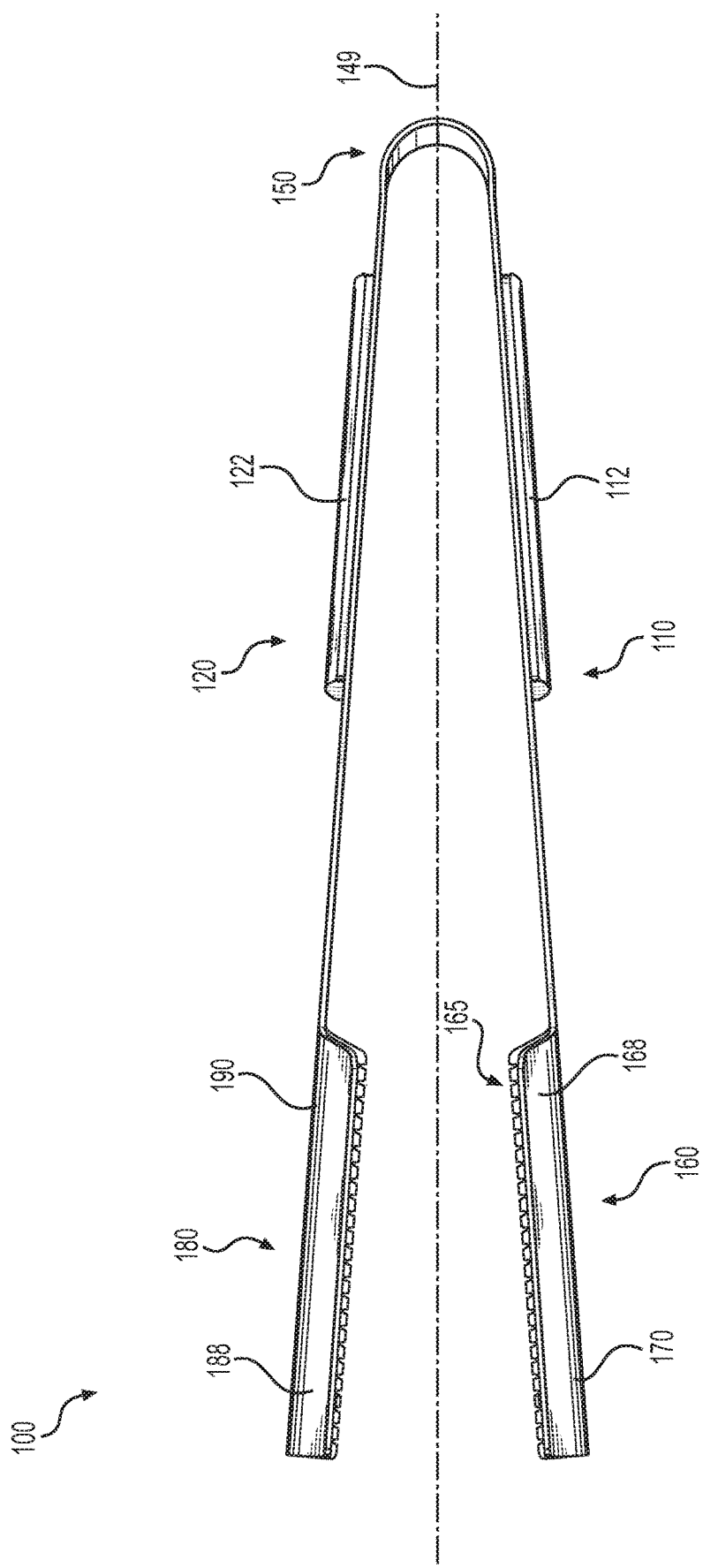
FIG. 6 is a top plan view of the tongs of FIG. 1.
Figure 7:
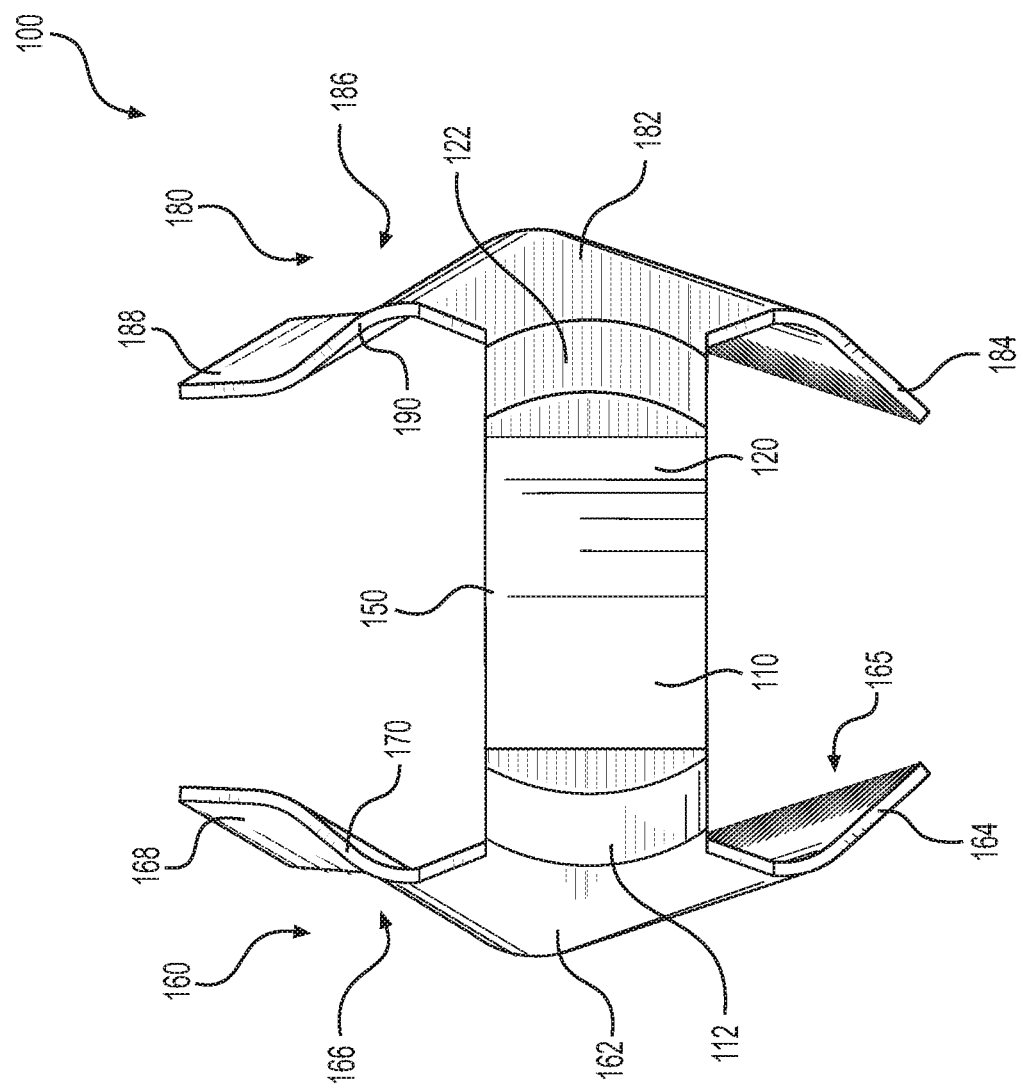
FIG. 7 is a rear elevation view of the tongs of FIG. 1.
Figure 8:
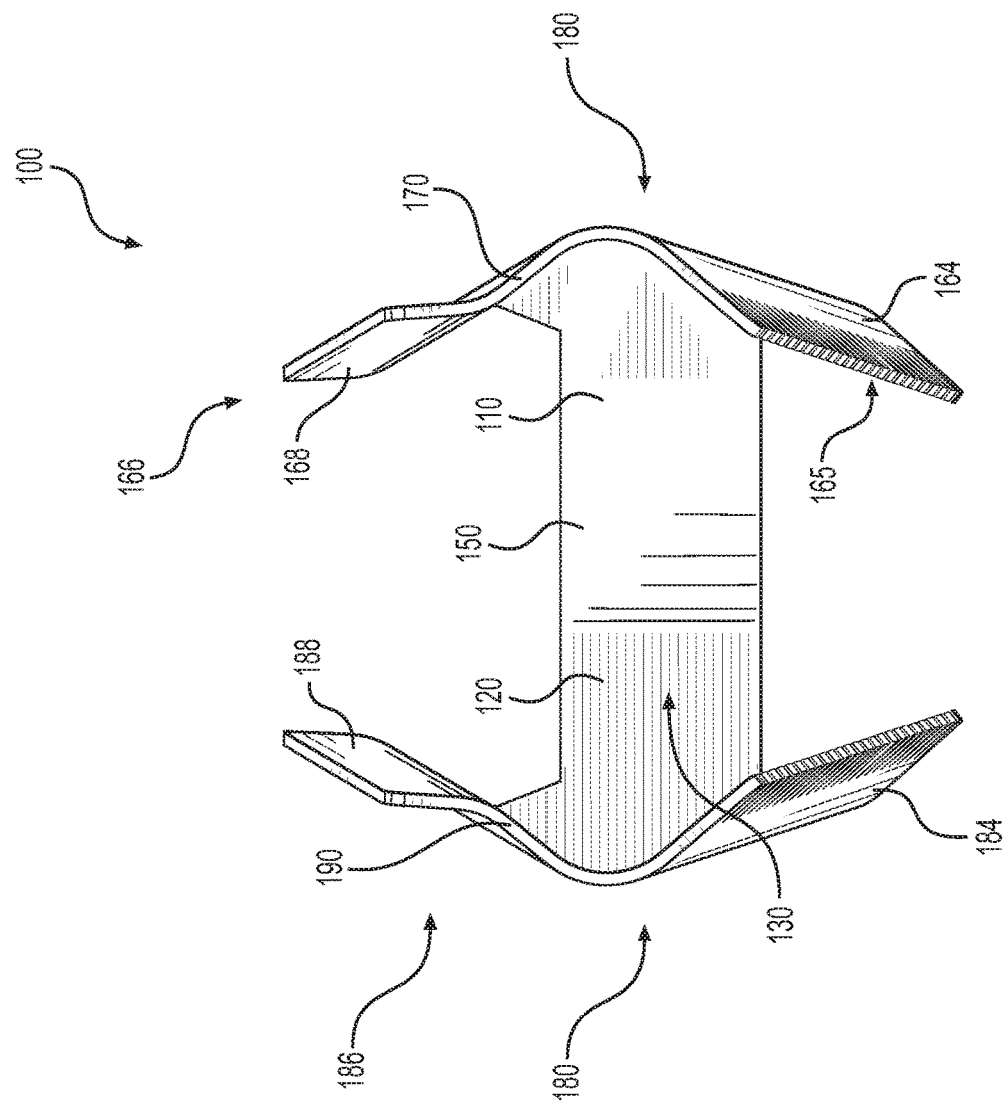
FIG. 8 is front elevation view of the tongs of FIG. 1.

Tongs 100 according to an implementation of the present technology will be described with respect to FIGS. 1 to 8. Directions used to describe an orientation of the tongs 100 are arbitrary, but will be used in order to described the relative locations of parts of the tongs 100.

The tongs 100 include a left arm 110 and a right arm 120. The left arm 110 defines a center line 145, which runs through a longitudinal center of the arm 110. The bottom arm 120 defines a center line 147, which runs through a longitudinal center of the arm 120. A center plane 141 is defined by the two center lines 145, 147, which is a generally horizontal plane 141 transecting the tongs 100. A generally vertical plane 149, perpendicular to the center place 141, delineates a left half and a right half of the tongs 100. In some implementations, the left and right arms 110, 120 may include one or more embossed rib to aid in strengthening the arms 110, 120.

The left and right arms 110, 120 connect to a connecting portion 150. The connecting portion 150 biases the arms 110, 120 away from each other. It is contemplated that the connecting portion 150 could use other mechanisms for biasing the arms 110, 120 away from each other, for example, a spring-loaded hinge. For instance, the connection portion 150 could include a spring connected to the arms 110, 120. It is also contemplated that the connecting portion 150 could include additional features, including but not limited to: a locking mechanism to hold the arms 110, 120 in a closed position and a loop for hanging the tongs 100 from a hook.

The left arm 110 connects to a left head portion 160. The left head portion 160 includes a central portion 162, which tapers from its widest part toward a front edge, as the portion 162 extends in a direction away from the connecting portion 150. It is contemplated that the central portion 162 could be wider or narrower than illustrated in the Figures, as well as being differently shaped. It is also contemplated that the tongs 100 could omit the defined central portion 162 in some implementations.

Extending generally down from the central portion 162 is a gripper portion 164. The gripper portion 164 curves down from the central portion 162, defining part of a cavity 130 shaped to hold a cylindrically shaped food item, such as a sausage. Use of the cavity 130 and the gripper portion 164 will be described in more detail below. A majority of the gripper portion 164 lies to the below the center plane 141. It is contemplated that more or less of the gripper portion 164 could be disposed below the center plane 141. The gripper portion 164 includes a plurality of teeth 165 at its edge opposite the center plane 141. The teeth 165 have blunt edges, but it is contemplated that the teeth 165 could be more or less pointed, depending on the implementation. In some implementations, the teeth 165 could include thinner bottom edges to provide some cutting capability. It is also contemplated that the gripper portion 164 could include more or less teeth 165. It is further contemplated that the tongs 100 could omit the plurality of teeth 165. It is also contemplated that the gripper portion 164 could be provided with a functional edge shape, such as a scalloped edge, in place of the plurality of teeth 165. The tapered form of the central region 162 allows the user to hold the tongs 100 at an angle to a cooking surface, while the gripper portion 164 is oriented generally parallel to the cooking surface when the user is utilizing the gripper portion 164. This generally allows the user to hold the tongs 100 more naturally and to keep the user's hands further away from the cooking surface.

The left head portion 160 also includes a spreader portion 166, made up of a transition region 170 and a blade portion 168. The transition region 170 extends up from the central portion 162, and is curved similarly to the gripper portion 164 to help define the cavity 130. The blade 168 is generally parallel to the central portion 162, but disposed closer to the plane 149. It is contemplated that the transition region 170 and the blade 168 could be more or less curved, depending on the implementation. It is also contemplated that the blade 168 could be at an angle other than parallel to the central portion 162. All of the spreader portion 166 is disposed above the center plane 141, but it is contemplated that some portion of the spreader portion 166 could be disposed below the center plane 141. Use of the spreader portion 166 will be described in more detail below. The tapered form of the central region 162 allows the user to hold the tongs 100 at an angle to a cooking surface, while the spreader portion 166 is oriented generally parallel to the cooking surface when the user is utilizing the spreader portion 166. This generally allows the user to hold the tongs 100 more naturally and to keep the user's hands further away from the cooking surface.

Similarly, the right arm 120 connects to a right head portion 180. The right head portion 180 includes a gripper portion 184 curving down from a central portion 182 and a spreader portion 186 curving upward from the central portion 182 including a transition region 190 and a blade portion 188. The left and right head portions 160, 180 are mirror images of each other about the plane 149. It is contemplated that in some implementations the left and right head portions 160, 180 could be not mirror images of each other.

The tongs 100 are made of stainless steel, with hardened plastic handle portions 112, 122. It is contemplated that the tongs 100 could be made from a number of different materials, including but not limited to: steel, aluminum, ceramic, silicon, and heat resistant plastic. It is also contemplated that the handle portions 112, 122 could be made from materials including but not limited to: silicon, heat resistant rubber, and wood. For the tongs 100, the handle portions 112, 122 are disposed only on external sides of the arms 110, 120, but it is contemplated that the handles 112, 122 could cover more or less of the tongs 100. It is also contemplated that the handle portions 112, 122 could connect the arms 110, 120 to the connecting portion 150, rather than just being an additional layer added to the arms 110, 120. It is further contemplated that the tongs 100 could be provided without the handle portions 112, 122.

Another implementation of tongs 200 will be described with respect to FIGS. 9 to 15. Similarly to the tongs 100, the tongs 200 include a left arm 210 and a right arm 220 connected to a connecting portion (not shown). In this implementation, the arms 210, 220 are riveted to their corresponding left and right head portions 260 and 280 by rivets 213. It is contemplated that the head portions 260, 280 could be connected to the arms 210, 220 by different means. As illustrated with respect to the tongs 100, the head portions 160, 180 can also be integral with the arms 110, 120.

As before, the left head portion 260 includes a gripper portion 264 with a plurality of teeth 265 extending from a central portion 262, and the right head portion 280 includes a gripper portion 284 with a plurality of teeth 285 extending from a central portion 282, both gripper portions 264, 284 being generally below the center plane 141. The left head portion 260 also includes a spreader portion 266 including a transition region 270 and a blade portion 268 and the right head portion 280 includes a spreader portion 286 including a transition region 290 and a blade portion 288, both spreader portions 266, 286 extending above the center plane 141.

Figure 10:
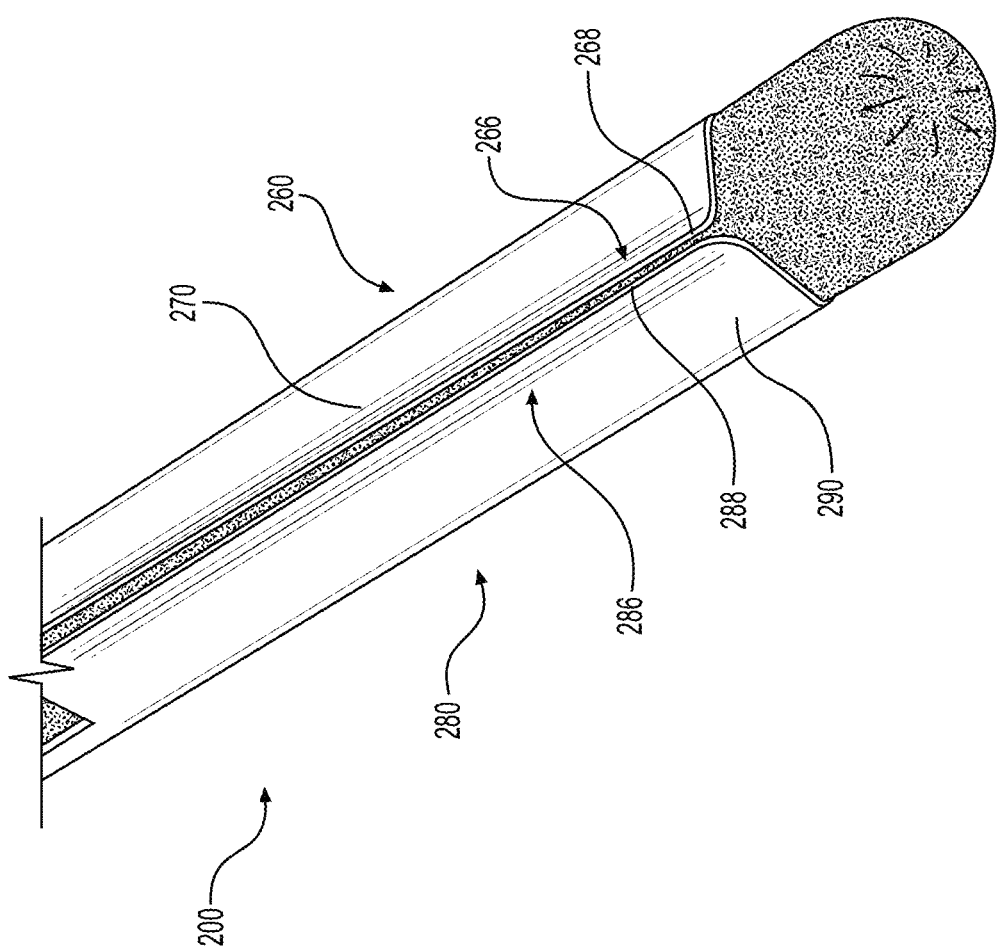
FIG. 10 is a partial top plan view of the tongs of FIG. 9, with the tongs holding a sausage.

While being slightly differently shaped and angled than the gripper and spreader portions 164, 184, 166, 186 of the tongs 100, the gripper and spreader portions 264, 284, 266, 286 of the tongs 200 similarly define a cavity 230 that is shaped to hold a hot dog, or other cylindrical shaped food item. As is illustrated in FIG. 10, the tongs 200 are illustrated holding a hot dog in the cavity, with the end of the hot dog extending out a front of the tongs 200.

Figure 9:
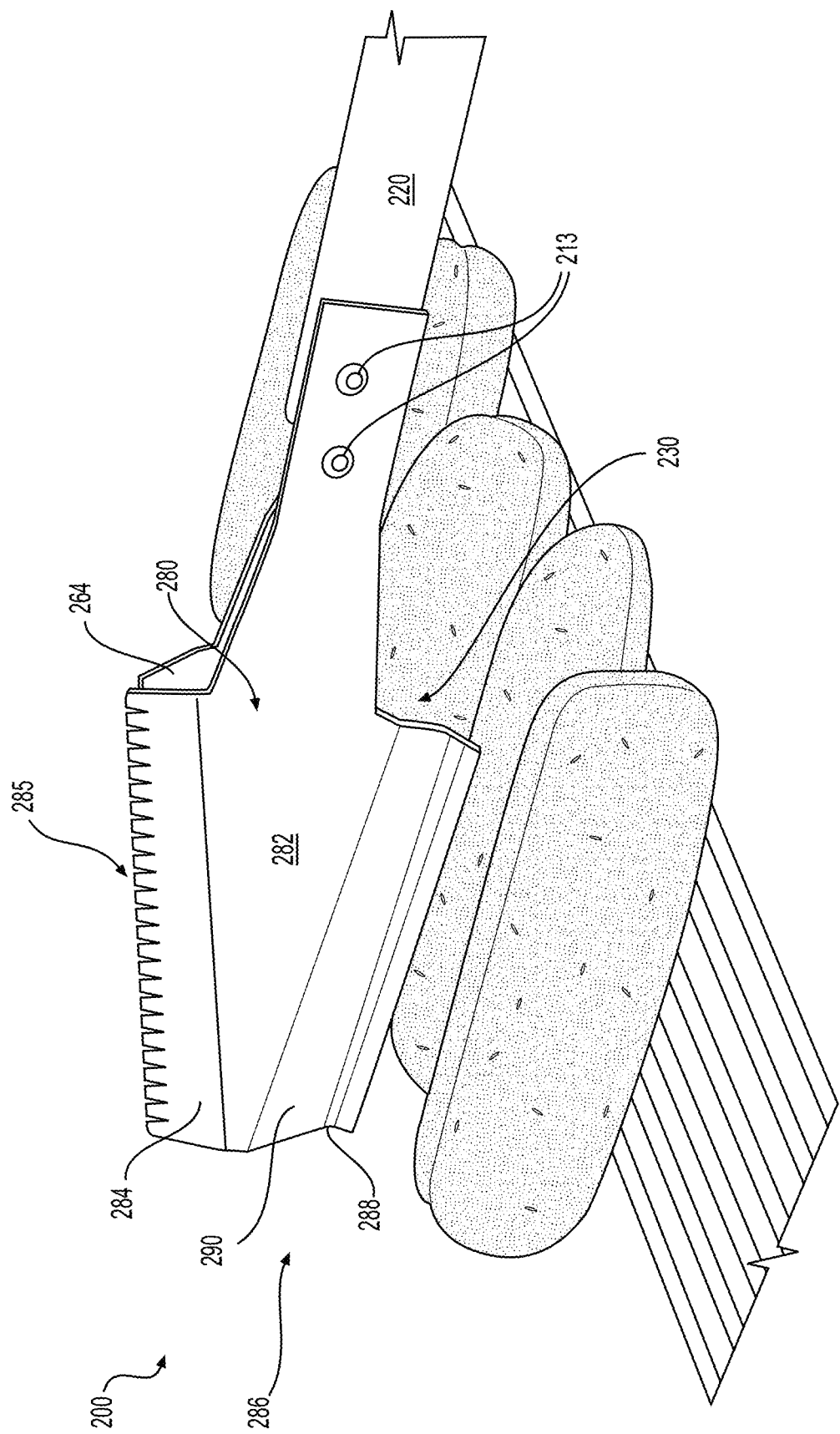
FIG. 9 is a partial rear, and right side perspective view of another implementation of tongs according to the present technology, shown in a grilling environment.

In FIG. 9, the tongs 200 are shown in use in one possible application. Specifically, the tongs 200 are shown being used to prepare hot dogs and their corresponding buns on a barbecue. In FIG. 10, the tongs 200 are shown holding a hot dog in the cavity 230. Use of the tongs 200 to prepare a sausage and bun assembly will be described with respect to a method of food preparation below.

Yet another implementation of tongs 300 will be described with respect to FIGS. 16 to 18, the tongs again including a left arm 310 with a left head portion 360 and a right arm 320 with a right head portion 380. The arms 310, 320 include handle portions 312, 322, portions of which can be seen in FIG. 16.

Similar to the implementations described above, the left head portion 360 includes a gripper portion 364 with a plurality of teeth 365 extending from a central portion 362, and the right head portion 380 includes a gripper portion 384 with a plurality of teeth 385 extending from a central portion 382, both gripper portions 364, 384 being mostly below the center plane 141. The left head portion 360 also includes a spreader portion 366 including a transition region 370 and a blade portion 368 and the right head portion 380 includes a spreader portion 386 including a transition region 390 and a blade portion 388, both spreader portions 366, 386 being above the center plane 141. As with the tongs 200, the head portions 360, 380 are connected to the arms 310, 320 by rivets 313. It is contemplated that the head portions 360, 380 could be connected to the arms 310, 320 by other fasteners, including but not limited to: nuts and bolts.

In this implementation, the gripper and spreader portions 364, 366, 384, 386 are less curved than the similar portions of the tongs 100 or 200. Instead, the portions 364, 366, 384, 386 are generally flat and angled inward from the central portions 362, 382. The left and right head portions 360, 380 are mirror images of each other, and the angles will be described only with respect to the left head portion 360.

Figure 17:
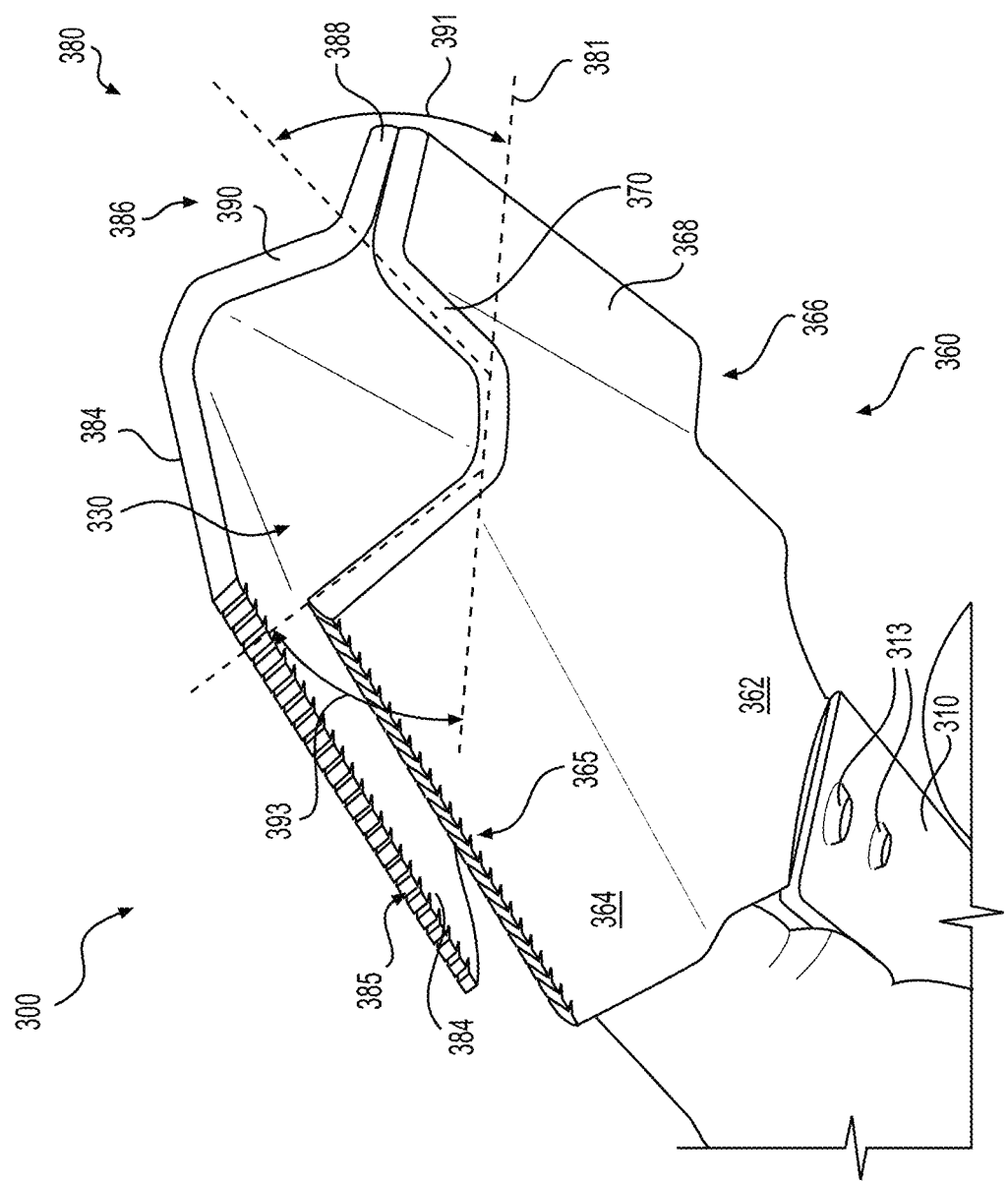
FIG. 17 is the partial front, left side perspective view of FIG. 16, with the tongs shown in a closed position.

As is illustrated in FIG. 17, the gripper portion 364 is at an angle 393 inward from a plane 381 defined by the central portion 362. The angle 393 is about 40 degrees from the plane 381, but it is contemplated that the angle 393 could be larger or smaller, depending on the implementation. The transition region 370 is at an angle 391 to the plane 381 and is also quite flatter than the comparable transition regions 170, 270 of the tongs 100, 200. The angle 391 is about 45 degrees from the plane 381, but it is similarly contemplated that the angle 391 could be larger or smaller, depending on the implementation.

While being differently shaped and angled than the corresponding portions of the tongs 100 and 200, the gripper and spreader portions 364, 384, 366, 386 of the tongs 300 similarly define a cavity 330 that is shaped to hold a hot dog, or other cylindrical shaped food item.

Figure 16:
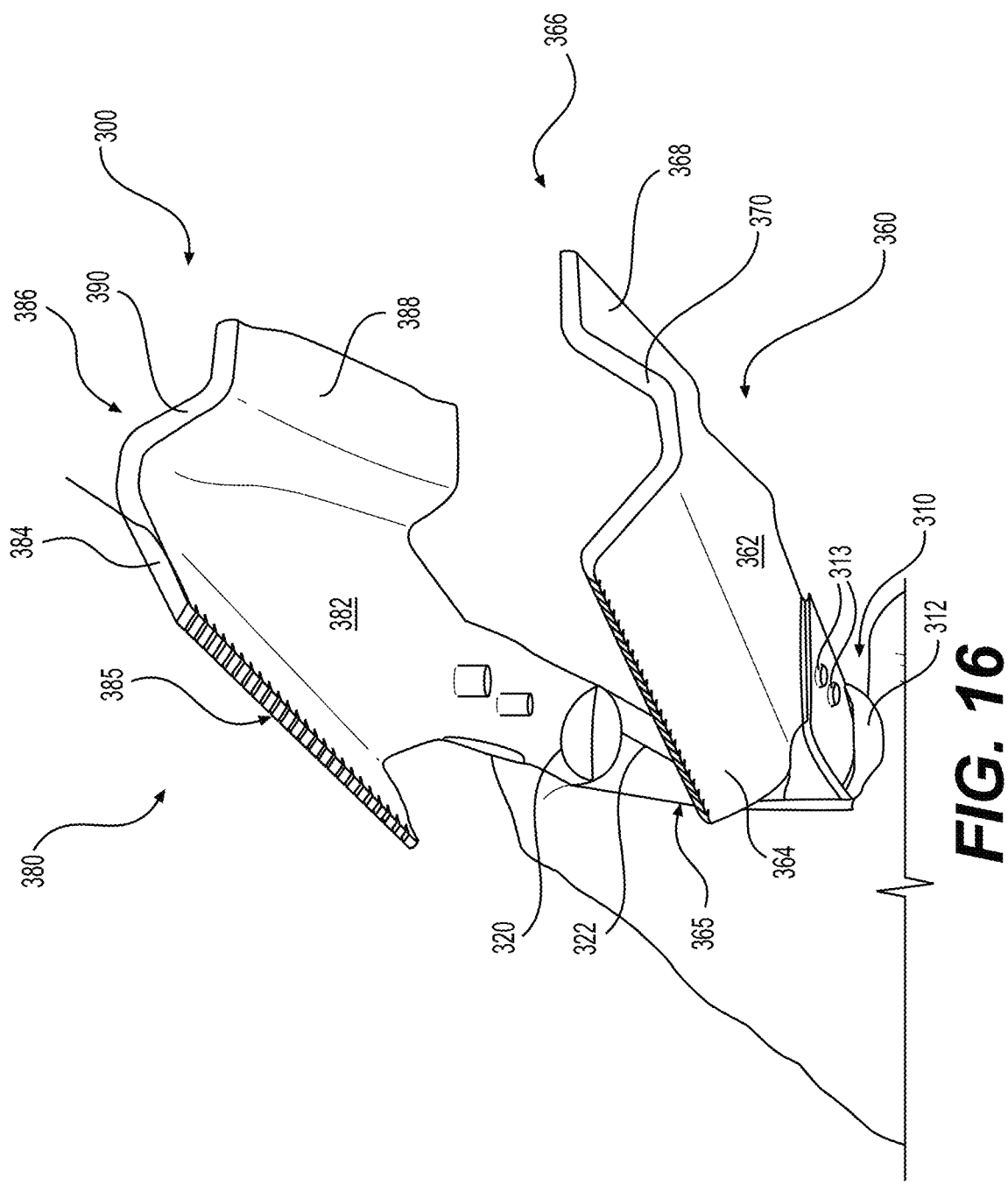
FIG. 16 is a partial front, left side perspective view of yet another implementation of tongs according to the present technology, with the tongs shown in an open position.
Figure 18:
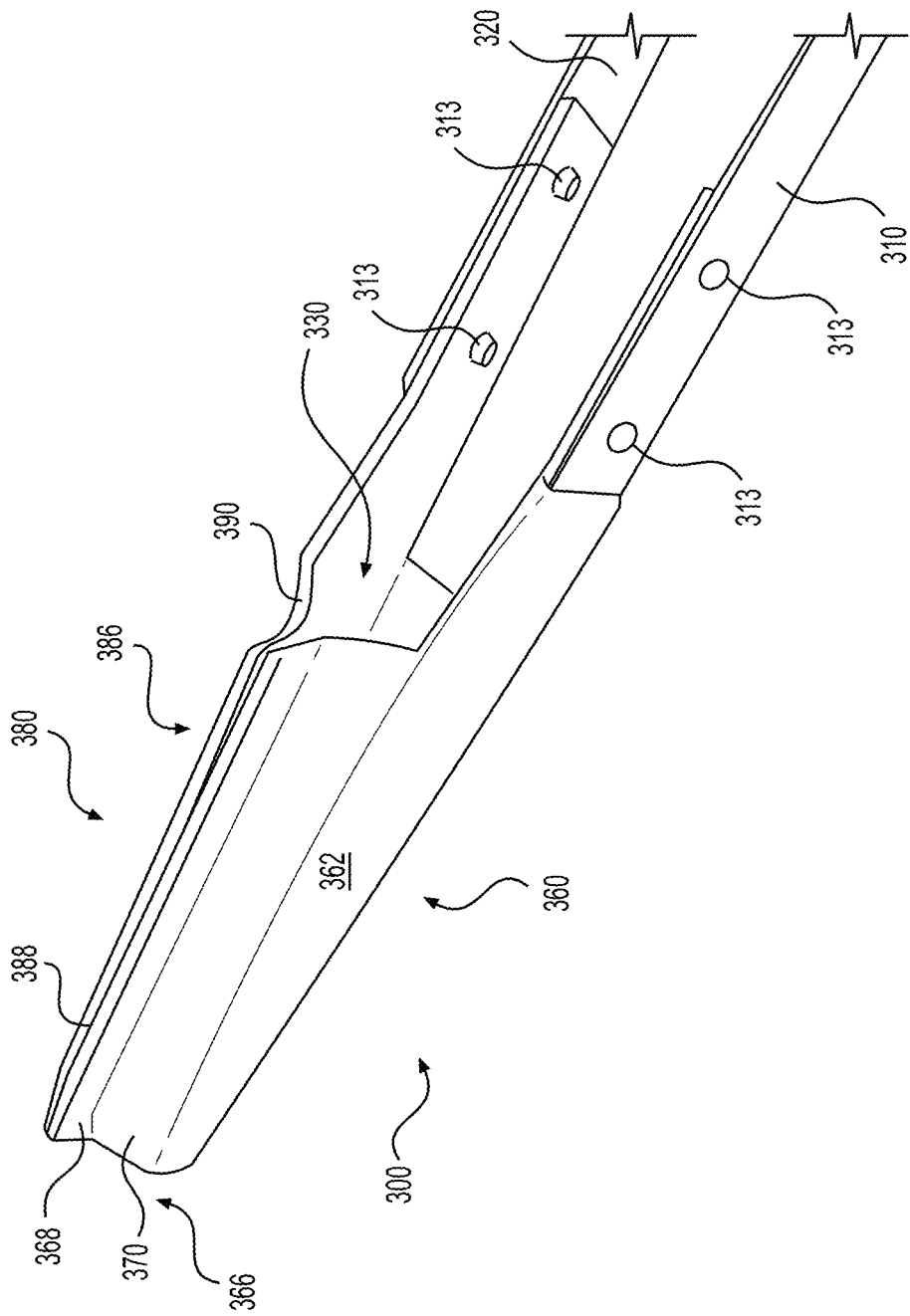
FIG. 18 is a partial rear, top, and left side perspective view of the tongs of FIG. 16, with the tongs shown in a closed position.

The tongs 300 are shown in an open position in FIG. 16 and a closed position in FIGS. 17 and 18. When in the closed position, the blade portions 368, 388 are in contact, while the gripper portions 364, 384 are separated by a gap. It is contemplated that the gripper portions 364, 384 could come into contact when the tongs 300 are in the closed position in some implementations.

A method for preparing a sausage and bun on a barbecue using the tongs 200 will now be described with respect to FIGS. 9 through 15, although the method can be performed equally with the tongs 100 and 300. The method can also generally be performed with other types of food items, and on with respect to other cooking surfaces.

To begin, an uncooked sausage is removed from its packaging and placed on a hot grill surface of the barbecue. In some implementations, the tongs 200 could include a sharp edge for opening a package containing the uncooked sausage. The sausage is placed on the grill to cook, either using the tongs 200 or with some other implement. Some users may prefer to use another implement to handle the uncooked sausage to avoid cross-contamination.

As the sausage cooks on the barbecue, the user grabs the sausage with the gripper portions 264, 284 and turns the sausage to assure even cooking of all sides of the sausage. The teeth 265, 285 help grip the sausage to prevent the round edge of the sausage from slipping as the tongs 200 are turned to flip the sausage. As the teeth 265, 285 are fairly blunt, the sausage is generally not pierced by the teeth 265, 285, which could cause juices important for flavor and texture to escape. Some users may also use an exterior side of the blade portions 268, 288 to roll the sausage. The user toasts the bun on the grill as well, turning it and removing it when toasted to its desired finish with the gripper portions 264, 284 and/or the blade portions 268, 288 of the tongs 200 as well.

Figure 11:
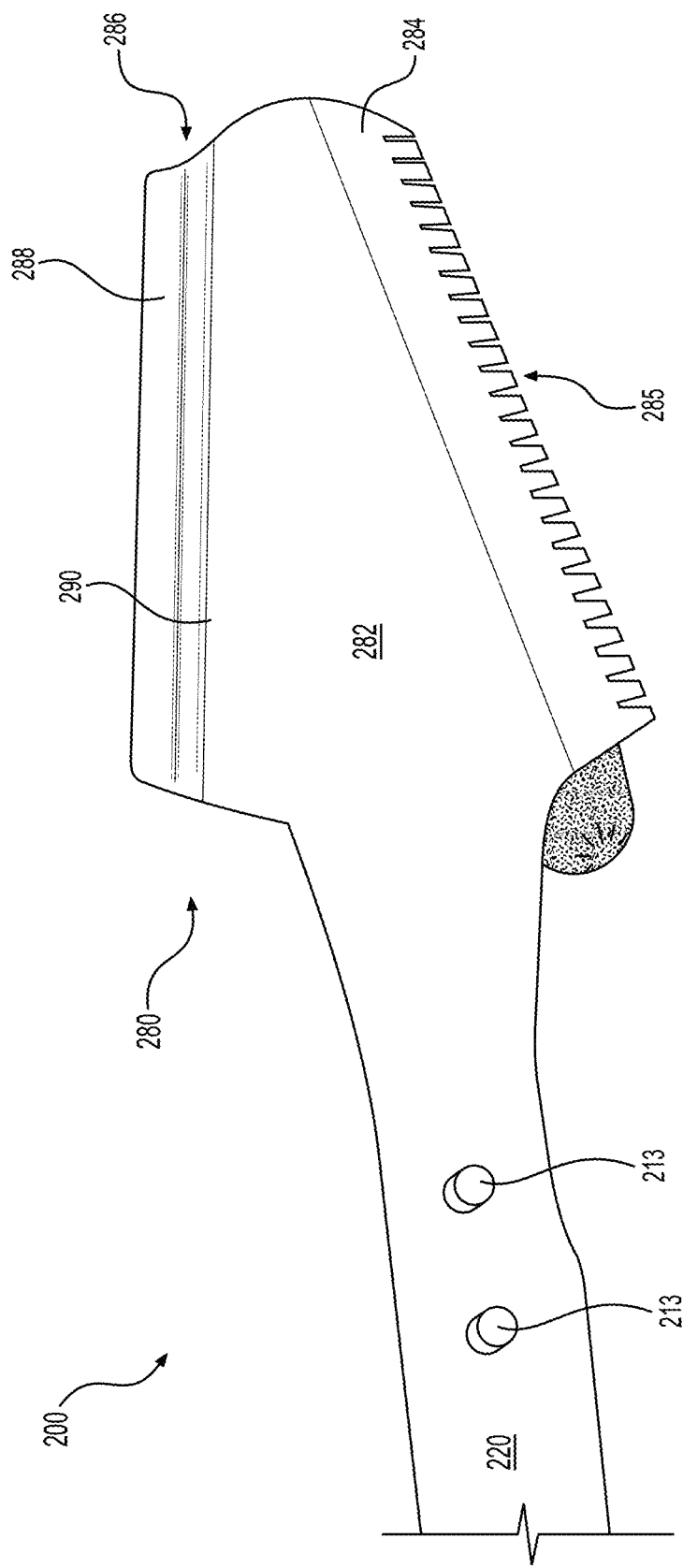
FIG. 11 is a partial right side elevation view of the tongs of FIG. 9, with the tongs holding a sausage.

When the sausage has finished cooking, the user grabs the sausage with the two gripper portions 264, 284 of the tongs 200 by moving the arms 210, 220 toward each other. As can be seen in FIGS. 10 and 11, the tongs 200 are in the closed position and the sausage fits in the cavity 230 and is held sufficiently securely to move the sausage from the barbecue to its bun. The separation between the edges of the gripper portions 264, 284 and the spaces between the teeth 265, 285 allow any liquids dripping from the sausage to drain away, instead of being transferred to the bun (causing undesirable soggy bread).

The user then flips the tongs 200 about the center plane 141, such that the gripper portions 264, 284 are oriented upwards and are now above the blade portions 268, 288, as illustrated in FIG. 9, keeping the tongs 200 in the closed position. The tapered shape of the central portions 262, 282 and the shape of the transition regions 270, 290 allow the sausage to align with the spreader portions 266, 286, especially with the blade portions 268, 288.

Figure 12:
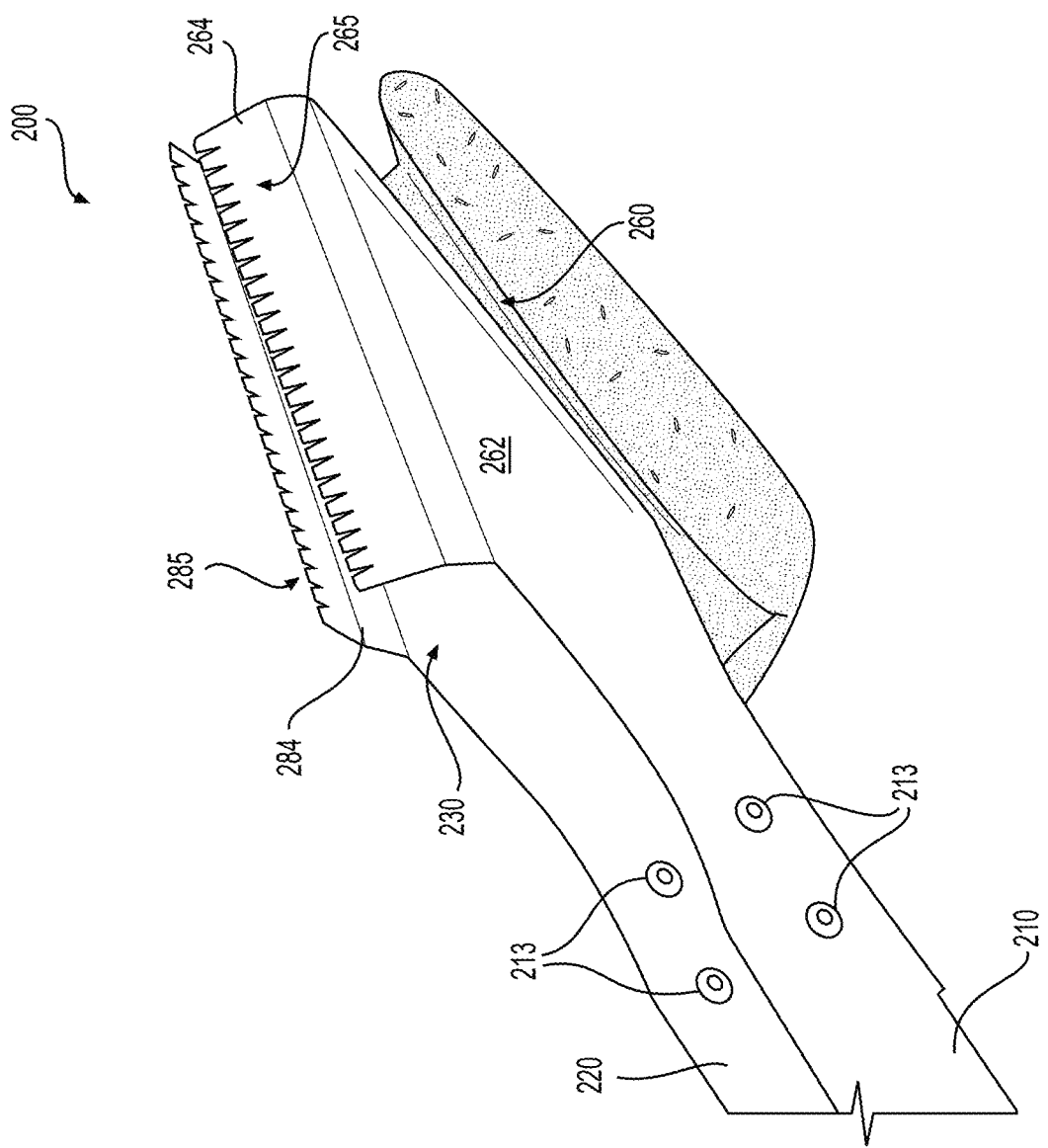
FIG. 12 is a partial rear, left side perspective view of the tongs of FIG. 9, with the tongs holding the sausage and being inserted into a sausage bun.
Figure 13:
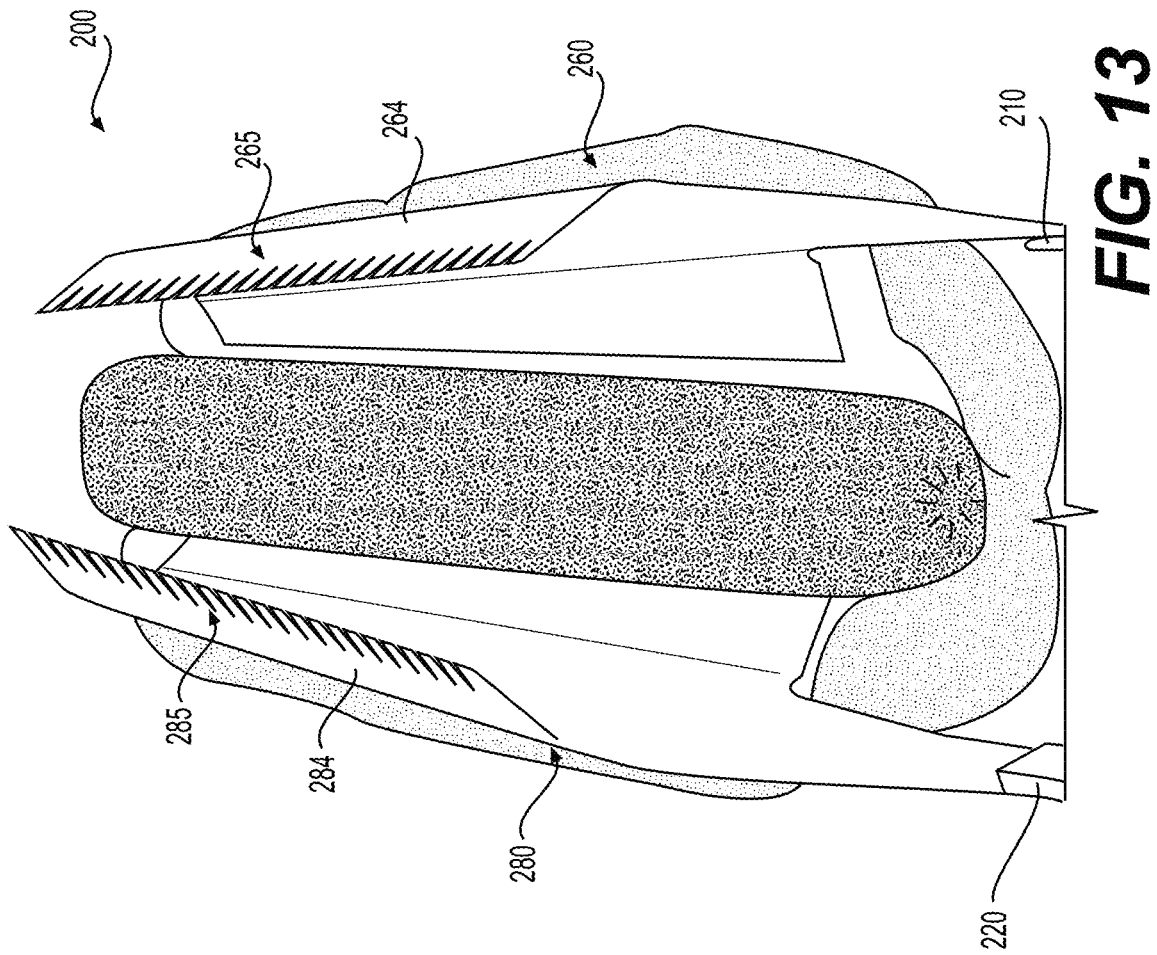
FIG. 13 is another partial bottom, rear perspective view of the tongs of FIG. 9, with the tongs inserted into a sausage bun, the bun being spread open by the tongs to place the sausage therein.
Figure 14:
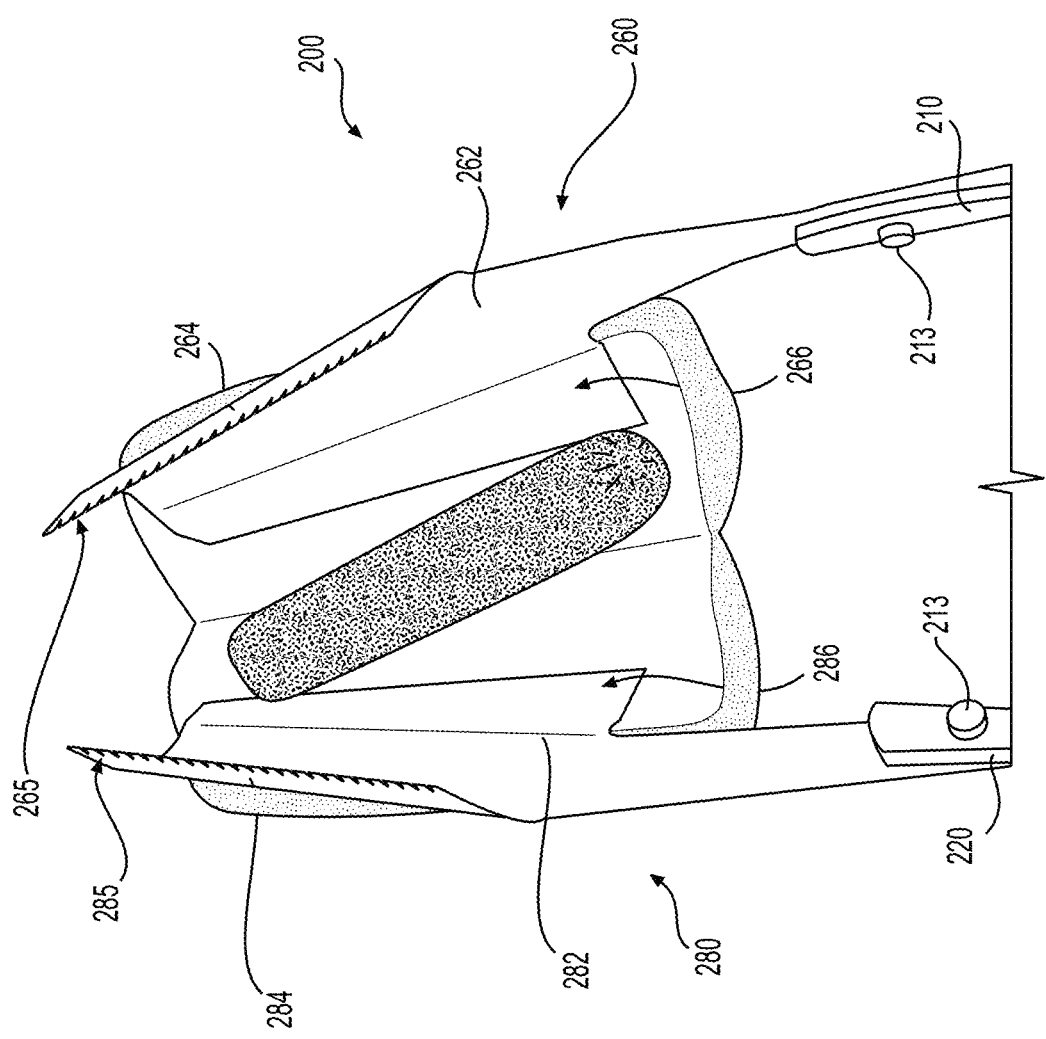
FIG. 14 is the tongs and bun of FIG. 13, with the bun shown further opened by the tongs and the sausage placed therein.

The blade portions 268, 288 are then inserted into the bun, with the tongs 200 still in the closed position, where the sausage is typically placed. This is illustrated in FIG. 12, where the tongs 200 have been inserted into a toasted bun. As can be seen in at least FIG. 9, the blade portions 268, 288 are in contact in the closed position, allowing fairly easy entry into the bun.

The tongs 200 are then allowed to open to the open position, a connecting portion (not shown) of the tongs 200 biasing the two arms 210, 220 away from each other. As the tongs 200 open, portions of the bun are spread apart by the spreader portions 266, 268 and the sausage drops in the bun. As can be seen from FIGS. 13 and 14, the spreader portions 266, 268 hold the bun open and the sausage simply falls out of the cavity 230 into the space created in the bun by the tongs 200. The user has now successfully transferred the cooked sausage from the grill into its toasted bun, without the need to manually manipulate the hot sausage or bun, nor has the user been required to use a second utensil to place the sausage in the bun.

Figure 15:
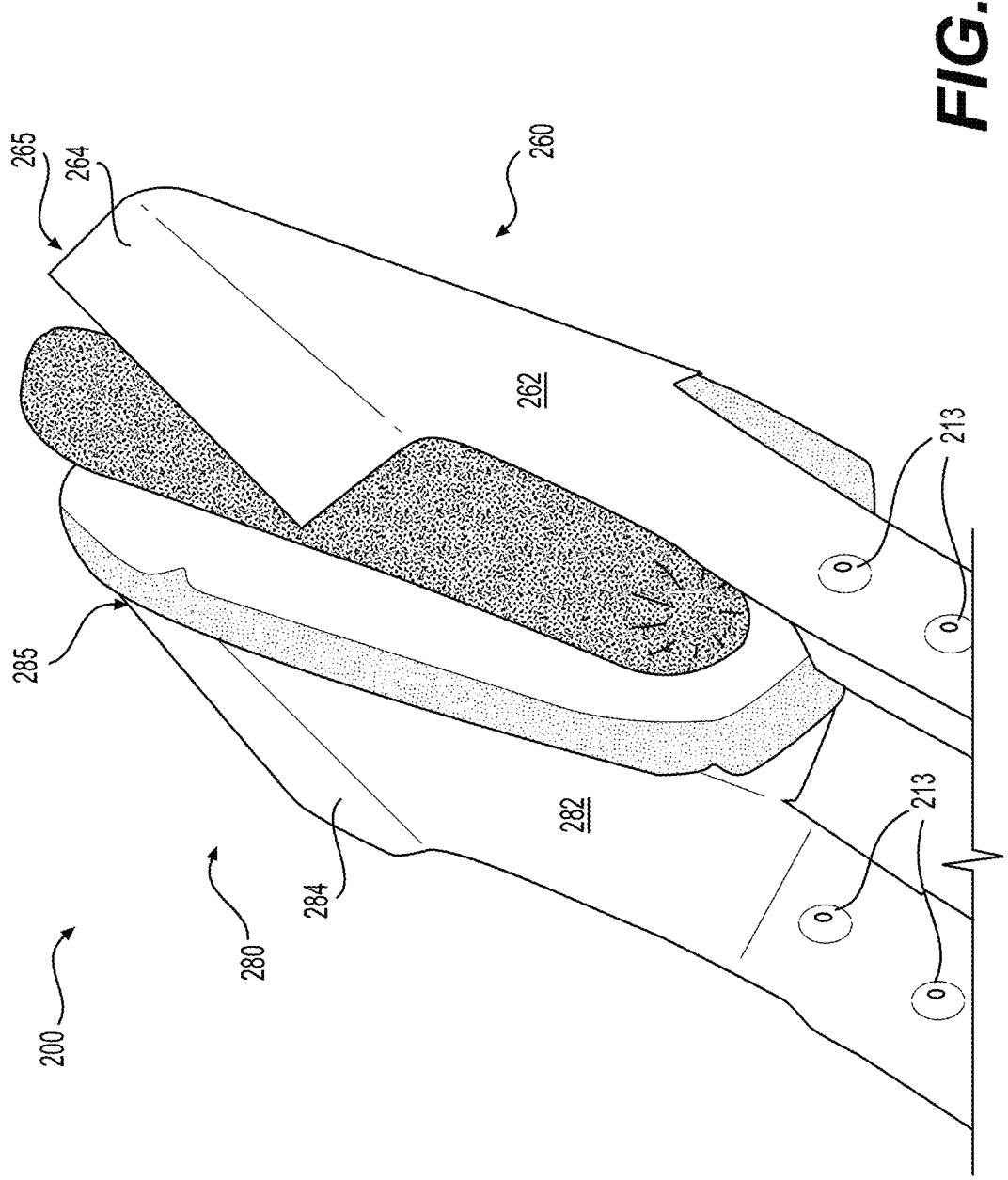
FIG. 15 is a partial bottom, rear, and left side perspective view of the tongs of FIG. 9, with the tongs holding the bun and the sausage deposited therein.

The cooked sausage and toasted bun now assembled, the tongs 200 can further be utilized for serving the assembly, as is shown in FIG. 15. The cavity 230 is sufficiently large to be able to grip the bun and sausage assembly, allowing the user to serve the assembly onto a guest's plate while avoiding the user having to touch the bun.

It is contemplated that the method could include additional or different steps, either to perform additional functions and/or to perform the steps described above.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. Tongs for food preparation comprising:
a connecting portion;
a first arm connected to the connecting portion at a first end of the first arm, the first arm defining a first centerline extending through a center of the first arm;
a second arm connected to the connecting portion at a first end of the second arm, the second arm defining a second centerline extending through a center of the second arm, the first and second arms being disposed on a same side of the connecting portion;
a first head portion connected to the first arm at a second end of the first arm; and
a second head portion connected to the second arm at a second end of the second arm, each of the first and second head portions including:
a gripper portion for grabbing a food item when the first and second heads are brought toward each other, the gripper portion defining a portion of a cavity for holding the food item, and
a spreader portion for inserting into and spreading portions of a receiving food item when the first and second heads are moved away from each other, the spreader portion including a blade portion,
a central portion between the gripper portion and the spreader portion, the gripper and spreader portions connecting to their respective arms through the central portion, the blade portion being generally parallel to the central portion,
a majority of the gripper portion and a majority of the spreader portion of each of the first and second head portions being disposed on opposite sides of a center plane extending through the first and second centerlines, the gripper portions of the first and second head portions being both disposed on a first side of the center plane, the spreader portions of the first and second head portions being both disposed on a second side of the center plane.

2. The tongs of claim 1, wherein the first and second head portions are mirror images of each other about a plane passing through a center of the connecting portion, the plane being generally perpendicular to the center plane.

3. The tongs of claim 1, wherein the gripper portions of the first and second head portions each include a plurality of teeth, the plurality of teeth being disposed on a side of the gripper portions opposite the center plane.

4. The tongs of claim 1, further comprising:
a first handle portion connected to the first arm; and
a second handle portion connected to the second arm.

5. The tongs of claim 1, wherein the connecting portion biases the first and second arms apart.

6. The tongs of claim 1, wherein, when the tongs are in a closed position, the blade portions of the first arm and second head portions touch each other while the gripper portions of the first and second head portions are spaced from each other.

7. The tongs of claim 1, wherein, for each of the first and second head portions, the spreader portion and the gripper portion are integral with the central portion.

8. The tongs of claim 1, wherein, for each of the first and second head portions, the central portion tapers as the central portion extends away from the connecting portion.

9. The tongs of claim 1, further comprising, for each of the first and second head portions, a transition region between the blade portion and the central portion, the transition region defining an other portion of the cavity, the transition region being generally curved out away from the cavity.

10. The tongs of claim 1, further comprising, for each of the first and second head portions, a transition region between the blade portion and the central portion, the transition region being disposed at an angle of about 45 degrees toward the cavity from a plane passing though the central portion.

11. The tongs of claim 1, wherein the gripper portions of the first and second head portions are generally curved from the central portion toward an other one of the first and second head portions, the cavity defined at least in part by the gripper portions being configured for holding a cylindrical food item.

12. The tongs of claim 1, wherein the gripper portions of the first and second head portions are each disposed at an angle of about 40 degrees toward the cavity from a plane passing though the central portion.

13. The tongs of claim 1, wherein the cavity formed by the first and second head portions when in a closed position is configured to hold a cylindrical food item.

14. A method for preparing food using tongs, the method comprising:
   grabbing a cylindrical food item with two gripper portions of the tongs;
   flipping the tongs such that the gripper portions are oriented upwards, the cylindrical food item aligning with two spreader portions opposite the gripper portions;
   inserting the two spreader portions into a receiving food item; and
   opening the tongs such the cylindrical food item drops into the receiving food item.

15. The method of claim 14, further comprising gripping the cylindrical food item with the two gripper portions for turning the cylindrical food item during cooking.

16. The method of claim 15, wherein opening the tongs spreads apart portions of the receiving food item.

* * * * *